Feb. 8, 1927.
J. A. PORTIS
1,616,548
RADIUS ROD
Filed March 30, 1926
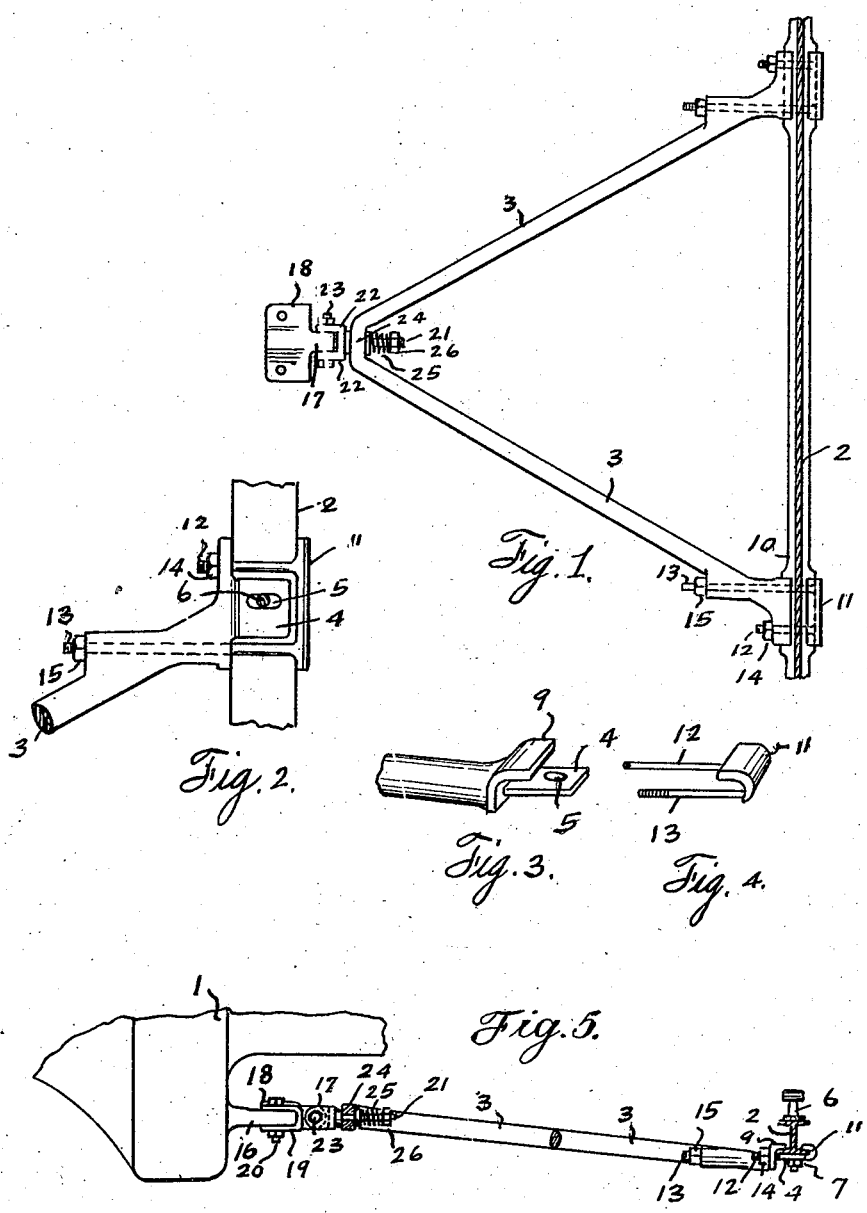
Inventor
James A. Portis
By Hardway Cather
Attorneys Patented Feb. 8, 1927.

1,616,548

UNITED STATES PATENT OFFICE.

JAMES A. PORTIS, OF DAISETTA, TEXAS.

RADIUS ROD.

Application filed March 30, 1926. Serial No. 98,487.

This invention relates to new and useful improvements in a radius rod.

One object of the invention is to provide a radius rod having a yieldable connection with the ball socket on the front of the vehicle motor and a secure but detachable connection with the front axle of the vehicle.

Another object of the invention is to provide a radius rod which may be cheaply produced, easily installed and which is very efficient in use.

With the above and other objects in view this invention has particular relation to certain novel features of construction, arrangement of parts and use, an example of which is given in this specification and illustrated in the accompanying drawings, wherein:—

Figure 1 shows a plan view of the radius rod connected to the front axle of the vehicle, said axle being shown in section.

Figure 2 shows a fragmentary bottom plan view thereof.

Figure 3 shows a fragmentary perspective view of the front end of the rod.

Figure 4 shows a perspective view of the securing clamp employed.

Figure 5 shows a fragmentary side elevation, partly in section, showing the radius rod connected to the motor and front axle of the vehicle.

Referring now more particularly to the drawings, wherein like numerals of reference designate similar parts in each of the figures the numeral 1 designates the vehicle motor and the numeral 2 designates the front axle. The radius rod has the forwardly diverging arms 3, 3, formed integrally together. Each arm is widened outwardly at its forward end and has a flat tongue-like extension 4 which fits against the under side of the axle 2 and is provided with an elongated hole 5 through which the shank of the spring perch 6 fits. The usual nut 7, which holds the spring perch in place, also secures the extension 7 against detachment from the axle. The forward end of each arm 3 also has an integral lip 9 which engages over the rear edge of the adjacent lower flange 10, of the axle 2.

There is a clamp 11, arcuate in cross section which engages over the front edge of said flange 10. This clamp has the bolts 12, 13, square in cross section, formed integrally therewith. These bolts lie underneath the axle 2 and their rear ends are fitted through aligned bearings in the front end of the corresponding arm 3 and have the end nuts 14, 15, screwed thereon to hold them against detachment.

The numeral 16 designates the ball socket on the front end of the motor crank case. There is a yoke 17 formed with upper and lower clamp plates 18, and 19 which embrace the ball socket and are clamped thereto by means of the side clamp bolts 20, 20.

A swivel bolt 21 is formed with spaced side fingers 22, 22, which embrace the forward end of the yoke 17 and a bolt 23 is fitted through said fingers and said end of the yoke and forms a hinge connection. The swivel bolt is fitted through a bearing 24, at the junction of the arms 3 and a coil spring 25 surrounds said rod 21 and is interposed between the bearing 24 and the nut 26 which is screwed onto the forward end of said rod.

The radius rod thus has a yielding connection with the motor and its arms are very securely connected to the front axle.

What I claim is:—

1. A radius rod including diverging arms, tongue-like extensions carried by the forward ends of said arms and adapted to fit against the under side of the front axle of a vehicle, a flange engaging lip integral with said end of said arms and spaced above said extension, a clamp formed to engage over the front flange of said axle, bolts carried by said clamp and adapted to fit against the underside of said axle, the adjacent ends of said arms having bearings, said bolts fitting through said bearings.

2. A radius rod arm whose forward end has a tongue-like extension and a pair of bolt bearings, said extension also having a bearing, a lip integral with said end of said arm and spaced above said extension, a clamp, a pair of bolts carried by said clamp and passing through the bearings of said pair and means securing said bolts in said bearings.

In testimony whereof I have signed my name to this specification.

JAMES A. PORTIS.